Aug. 7, 1923.

1,464,452

J. R. STARCK

CLASP FOR JEWELRY

Filed Aug. 24, 1922

WITNESSES

INVENTOR
John R. Starck
BY
ATTORNEYS

Patented Aug. 7, 1923.

1,464,452

UNITED STATES PATENT OFFICE.

JOHN R. STARCK, OF WEEHAWKEN, NEW JERSEY.

CLASP FOR JEWELRY.

Application filed August 24, 1922. Serial No. 584,114.

*To all whom it may concern:*

Be it known that I, JOHN R. STARCK, a citizen of the United States, and a resident of Weehawken, in the county of Hudson and State of New Jersey, have invented a new and Improved Clasp for Jewelry, of which the following is a full, clear, and exact description.

The present invention relates to new and useful improvements in clasps for jewelry and it pertains more particularly to a clasp for connecting together the ends of necklaces, bracelets, and the like.

It is one of the primary objects of the invention to provide a clasp which will be securely held against accidental displacement of the members relative one to the other.

It is a further object of the invention to provide a clasp of this character which may be readily operated to open and close the same.

With above and other objects in view, reference is had to the accompanying drawings, in which—

Figure 1:
Figure 1 is a view in elevation of a clasp constructed in accordance with the present invention showing the two members of the clasp in engaged position.
Figure 2:
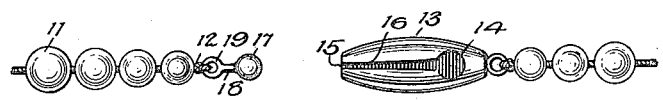
Fig. 2 is a similar view showing the members of the clasp in disengaged position.
Figure 3:
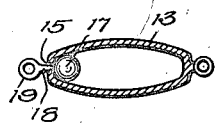
Fig. 3 is a longitudinal sectional view of the clasp per se showing the members in their interengaged position.

Referring more particularly to the drawings, the reference character 11 designates a necklace and 12 designates the ends thereof. Secured to one of the ends 12 of the necklace is a hollow member 13 and said member may be oval, cylindrical or any other shape desired. One of the walls of the hollow member 13 is provided with an opening 14 adjacent one of its ends and leading from said opening to the opposite end of the hollow member 13, which end is open as at 15, is a slot 16. This slot 16 tapers and its reduced width is adjacent the open end 15 of the hollow member 13.

Secured to the opposite end 12 of the necklace 11, is a ball member 17, and projecting therefrom is a shank 18, which is formed with an eye 19 by which it is secured to its respective end 12 of the necklace 11. The shank 18 may be round, square, or of oval cross sectional form, and is adapted to be received in the open end 15 of the hollow member 13.

The device operates in the following manner: When it is desired to connect the two members of the clasp the ball member 17 is inserted into the opening 14 in the hollow member 13 and the shank 18 of the ball member 17 is passed through the slot 16. Due to the fact that the slot is tapered as the shank nears the end thereof a friction or binding action will be presented to the shank 18. As the shank is passed through this reduced portion it enters into the open end 15 of the hollow member 13, the ball member 17 being retained within the hollow member 13.

By reason of the reduced or tapered slot 16, it will be seen that sufficient pressure would be exerted upon the shank of the ball member 17 to prevent accidental displacement of the ball member relative to the hollow member 13 since the shank 18 of the ball member 17 would have to be forced through the slot 16 in order to effect a disengagement of the parts.

From the foregoing it is apparent that the present invention provides a new and improved clasp for necklaces and the like in which the several parts are retained against accidental displacement relative one to the other and, at the same time, a clasp which is simple in operation and economic in cost of manufacture, is had.

What is claimed is:

In a clasp for jewelry, a hollow shell member having a closed end and an open end, a slot formed in the side wall of said hollow member, said slot having an enlarged portion adjacent its closed end and extending from said enlarged portion to the open end of the shell member, the side walls of said slot converging whereby a contracted passage formed, a ball member adapted to be received within the shell member by insertion through the enlarged portion of said slot, and a shank carried by the ball member and adapted to pass through the contracted portion of said slot to the open end of the shell member, said shank being of a thickness whereby friction will be produced upon the shank as it passes through the contracted portion of the slot to prevent accidental displacement of the ball member with respect to the shell member.

JOHN R. STARCK.